United States Patent [19]

Wagner et al.

[11] 4,067,820

[45] Jan. 10, 1978

[54] HIGH MOLECULAR WEIGHT, INSOLUBLE CARBODIIMIDIZATION CATALYSTS

[75] Inventors: Kuno Wagner, Leverkusen; Hans-Dieter Block; Walter Schäfer, both of Cologne, all of Germany

[73] Assignee: Bayer Aktiengesellschaft, Leverkusen, Germany

[21] Appl. No.: 653,795

[22] Filed: Jan. 30, 1976

[30] Foreign Application Priority Data

Feb. 1, 1975   Germany ............................. 2504334

[51] Int. Cl.$^2$ ..................... C08G 18/16; B01J 31/22
[52] U.S. Cl. ............................ 252/426; 260/2 H; 260/2.5 BF; 260/77.5 AB; 260/606.5 P; 204/159.11; 252/428; 252/430; 252/431 P; 260/551 CD
[58] Field of Search ............... 260/2.5 BF, 551 CD, 260/77.5 AB, 606.5 P, 2 H; 252/426, 428, 430, 431 P

[56] References Cited

U.S. PATENT DOCUMENTS

| 3,126,404 | 3/1964 | Flynn et al. ......................... 252/426 |
| 3,714,246 | 1/1973 | Smith et al. .................... 260/606.5 P |
| 3,767,708 | 10/1973 | Smith et al. ......................... 252/426 |
| 3,823,111 | 7/1974 | Loew et al. ................. 260/77.5 AA |
| 3,911,041 | 10/1975 | Kaelling et al. ..................... 252/437 |

*Primary Examiner*—H.S. Cockeram
*Attorney, Agent, or Firm*—Gene Harsh; Joseph C. Gil

[57] ABSTRACT

The instant invention relates to novel carbodiimidization catalysts consisting of a high molecular weight, insoluble matrix and low molecular weight carbodiimidization catalysts fixed to the matrix via ionic bonds. The novel high molecular weight catalysts are suitable for the preparation of storage stable, catalyst free, equilibrium mixtures of organic carbodiimides, uretone imines and isocyanates. Either the carbodiimide, or the uretone imine or both may contain isocyanate groups. Alternatively, mono and/or polyisocyanates free from carbodiimide and uretone imine groups may be added to the equilibrium mixture. The catalysts according to the invention are capable of bringing about selective carbodiimidization of individual isocyanates in a mixture of various isocyanates.

5 Claims, 2 Drawing Figures

HIGH MOLECULAR WEIGHT, INSOLUBLE CARBODIIMIDIZATION CATALYSTS

BACKGROUND OF THE INVENTION

Carbodiimides may be prepared from isocyanates by a particularly simple reaction even at room temperature based on the process disclosed in German Pat. No. 1,130,594 in which phospholine oxides are used as catalysts. Industrially the most important and effective catalysts which effect very rapid carbodiimidization of virtually any aromatic monoisocyanate and polyisocyanate, even at room temperature, and are capable of converting less reactive aliphatic or cycloaliphatic monoisocyanates and polyisocyanates into carbodiimides at temperatures starting from about 150° C. are those corresponding to the following general formulae:

These catalysts have been used commercially for the production of polycarbodiimide foams.

Experience has shown that carbodiimide formation with the aid of the above-mentioned readily soluble catalysts, which formation proceeds in the form of a homogeneous catalysis, cannot be stopped in such a way that carbodiimides or polycarbodiimides which contain isocyanate groups are obtained as reaction products which are stable in storage. It is likewise not possible to prepare stable solutions of diisocyanatocarbodiimides, such as or α,ω-diisocyanato-bis-carbodiimides, α,ω-diisocyanato-tris-carbodiimides or isocyanato-uretone imines, such as those corresponding to the formula:

in excess monomeric monoisocyanates or polyisocyanates. The reason for this failure in the art is that the catalytically highly active soluble phospholine oxides cannot be completely blocked by any of the known inactivating agents, such as phosphorus oxychloride, zinc chloride, dimethyl carbamic acid chloride, benzoyl chloride, hydrochloric acid, boron trifluoride, alkylating agents and the like. Neither the formation of carbodiimides nor the polymerization to polycarbodiimides and crosslinked products can therefore be completely stopped. Thus, because of the progressive (even though in some cases, slow) formation of carbodiimide, a high carbon dioxide pressure soon develops in closed reaction and/or storage vessels, which may result in serious accidents.

DESCRIPTION OF THE INVENTION

It has now surprisingly been found that carbodiimidization catalysts may be bound to an insoluble high molecular weight inorganic or organic matrix via ionic bonds without substantial reduction of their catalytic activity. High molecular weight, insoluble catalysts are thereby obtained which may be removed from the reaction mixture at any time so that it is now possible to convert monoisocyanates and, preferably, polyisocyanates into stable carbodiimides or polycarbodiimides which contain functional NCO-groups. It is also possible to produce stable mixtures of (poly)carbodiimides and polyisocyanates. One particularly surprising finding is that it is even possible to carry out selective carbodiimidization of certain monoisocyanates or polyisocyanates of an isocyanate mixture.

The present invention relates to high molecular weight carbodiimidization catalysts which are insoluble in water, the various carbodiimidization reactants and solvents (when used) and which consist of high molecular weight, insoluble matrix and low molecular weight carbodiimidization catalysts which are attached to this matrix via ionic bonds.

The present invention also relates to a process for the preparation of such catalysts, characterized in that a high molecular weight, insoluble inorganic or organic matrix which contains inoizable groups is brought into contact with a solution of low molecular weight carbodiimidization catalysts containing ionizable groups which carry charges opposite to those of the matrix.

The ionic bond between the high molecular weight matrix and low molecular weight carbodiimidization catalyst is preferably brought about by basic groups built into the matrix and acid groups built into the catalyst. The high molecular weight carrier materials used may be, for example, any inorganic or organic anion exchangers of the type described in the literature, for example in Houben Weyl, Volume I/1, Allgemeine Laboratoriumspraxis (1958), pages 525-532. Suitable inorganic carrier materials include skapolythes, hydroxyl apatites and iron oxide gels. Preferred organic carrier materials are cross-linked polymers or copolymers of styrene containing basic groups, of the type generally known and used in the art as anion exchangers. In general, however, it is suitable to use any high molecular weight, insoluble organic carrier material which has been prepared by polymerization or polycondensation reactions and which contains basic groups, for example those corresponding to the following formulae:

(R represents H, CH$_3$, C$_2$H$_5$, C$_3$H$_7$)

$$-(CH_2)_3-\underset{\underset{CH_3}{|}}{N}-CH_2-CH_2-CH_2-NH-\underset{\underset{O}{\|}}{C}-NH- \text{ or}$$

$$-NH-\underset{\underset{NH}{\|}}{C}-NH-$$

High molecular weight organic carrier materials of various chemical compositions which contain such basic groups will be described in detail in the Examples. Several commercial anion exchangers suitable for the process according to the invention are shown in Table 1. Additionally, much literature has been generated relative to the anion exchangers known in the art. Typical of such literature are U.S. Pat. Nos. 3,006,866 and 3,725,313, the disclosures of which are incorporated by reference.

Basic carrier materials suitable for the purpose of the invention also include polyethylene imines which have been cross-linked, for example, with 1,4-bis-(chloromethyl)-benzene, such as those described in "Die makromolekulare Chemie" 128 (1969), 229–235 (No. 3141).

The preferred carrier materials consist of polystyrene which has been cross-linked with from 2 to 6%, preferably from 4 to 5%, by weight, of divinyl benzene.

The carrier materials preferably contain from about $20.5 \times 10^{17}$ to $10.3 \times 10^{17}$ of the above-mentioned basic groups per milligram of the carrier materials.

It is of course also possible to utilize acidic carrier materials of the type known in the art provided that the carbodiimidization catalyst used is of a basic nature.

Apart from water, various solvents may be used in the process according to the invention. Examples are aliphatic and aromatic hydrocarbons which optionally may be chlorinated such as benzene, toluene, xylene and chlorobenzene; ketones such as acetone, methyl ethyl ketone and cyclohexanone; ethers, e.g. diisopropyl ether and dioxane; esters such as ethyl acetate and triethyl ortho formiate; amides such as dimethyl formamide and dimethyl acetamide; dimethyl sulfoxide; tetramethyl urea; alcohols such as methanol, ethanol and isopropanol. Water is the preferred solvent according to the invention.

| Matrix | Ionic Group | Grain Structure | Grain Size (mm) | bulk weight (g/l of resin after swelling) | Total capacity (m val/ml of resin after swelling) |
|---|---|---|---|---|---|
| Polystyrene containing divinyl benzene (prepared by introducing the ionic groups according to Example 5 into the polystyrene resin of Example 2 of U.S. Pat. No. 3,006,866) | $-\overset{\oplus}{N}(CH_3)_2CH_2CH_2OH$ | macroporous | 0.3–1.5 | 660–700 | 1.2 |
| Polystyrene containing divinyl benzene (prepared according to Example 6 of U.S. Pat. No. 3,006,866, but containing only 5% by weight divinyl benzene) | $-\underset{H}{\overset{\oplus}{N}}-(CH_3)_2$ | macroporous | 0.3–1.5 | 600–700 | 1.9 |
| Polystyrene containing divinyl benzene (prepared according to Example 2 of U.S. Pat. No. 3,006,866) | $-\overset{\oplus}{N}(CH_3)_3$ | macroporous | 0.3–1.5 | 650–700 | 1.2 |
| Polystyrene containing divinyl benzene (prepared according to Example 6 of U.S. Pat. No. 3,006,866, wherein the amine groups are only quaternized to an extent of 10%) | $-\underset{H}{\overset{\oplus}{N}}(CH_3)_2$ | macroporous | 0.3–1.2 | 600–700 | 1.5 |
| Polycondensate of epichlorohydrin and triethylene tetramine (prepared according to U.S. Pat. No. 3,725,313) | $-\overset{\oplus}{N}R_2H$ and $-\overset{\oplus}{N}R_3$ | in the form of a gel | 0.3–1.2 | approx. 700 | 2.2 |
| Polystyrene containing divinyl benzene (prepared according to Example 1 of U.S. Pat. No. 3,006,866, but containing only 5% by weight of divinyl benzene) | $-\overset{\oplus}{N}(CH_3)_3$ | no macropores | 0.3–1.2 | 680–750 | 1.6 |
| Polystyrene containing divinyl benzene (prepared according to Example 2 of U.S. Pat. No. 3,006,866, but without using the white spirit and containing only 5% by weight of divinyl benzene) | $-\overset{\oplus}{N}(CH_3)_3$ | no macropores | 0.3–1.2 | 700–750 | 1.3 |

The low molecular weight carbodiimidization catalyst which is to be fixed to the high molecular weight matrix must carry groups of opposite charge to that of the matrix. In principle, any known carbodiimidization catalyst which has been modified by the incorporation of at least one ionic group is suitable. As explained above, it is preferred to use catalysts which contain acid groups, for example, carboxylic, sulphonic, phosphonic acid groups, and the like. Cyclic phosphine oxides modified with phosphonic, thiophosphonic or phosphinic acid groups are particularly preferred for use according to the present invention because of their availability.

Compounds of this type correspond to the following general formula:

wherein
R¹ represents an alkyl, aryl or aralkyl group which contains up to 14 carbon atoms and which may be substituted, preferably by halogen;
R², R³ and R⁴ each represent a $C_1$-$C_4$ alkyl group, hydrogen, chlorine or bromine;
R⁵ represents hydrogen, a $C_1$-$C_{12}$ alkyl group and, if b=0, a $C_6$-$C_{12}$ aryl group;
X and Y represent oxygen or sulphur; and
a and b = 0 or 1.

Compounds of this type are relatively easily prepared by reacting 5-membered cyclic phosphine oxides corresponding to the general formulae:

wherein R¹, R², R³, R⁴ and X are as defined above with compounds corresponding to the following general formula which contain phosphorus-hydrogen bonds:

wherein a, b, R⁵ and Y are as defined above; and R⁶ represents an alkyl group or hydrogen. The reaction is conducted in the presence of known radical initiators or under the action of high energy radiation at temperatures of from about 50 to about 300° C, optionally followed by saponification.

Starting materials corresponding to the general formulae (II) and (III) are known and may be prepared by known methods (see G. M. Kosolapoff, L. Maier, Organic Phosphorus Compounds, Wiley-Interscience, New York, 1972, Volume 3, pages 370-371 and pages 458-463 and Volume 4, pages 9-10 and page 48). Aminophospholanes and aminophospoline oxides may be used (see Kosolapoff, supra). Such amines may correspond to the following formula:

wherein R¹ to R⁴ are as defined above.

The following are examples of such 5-membered unsaturated phosphine oxides, in which the double bond may be either in the 2,3-position or in the 3,4-position:
1-methyl-1-oxophospholine,
1-ethyl-1-oxophospholine,
1-butyl-1-oxophospholine,
1-(2-ethylhexyl)-1-oxophospholine,
1-methyl-1-thiophospholine,
1-(2-chloroethyl)-1-oxophospholine,
1-phenyl-1-oxophospholine,
1-p-tolyl-1-oxophospholine,
1-chloromethyl-1-oxophospholine,
1,3-dimethyl-1-oxophospholine,
1,2-dimethyl-1-oxophospholine,
1-methyl-3-chloro-1-oxophospholine,
1-methyl-3-bromo-1-oxophospholine,
1-chlorophenyl-1-oxophospholine,
1,3,4-trimethyl-1-oxophospholine,
1,2,4-trimethyl-1-oxophospholine,
1,2,2-trimethyl-1-oxophospholine,
1-phenyl-1-thiophospholine,
1-phenyl-3-methyl-1-oxophospholine and
1-phenyl-2,3-dimethyl-1-oxophospholine.

The following are examples of phosphorus-hydrogen compounds which may be used according to the invention:

dimethyl phosphite,
diethyl phosphite,
diisopropyl phosphite,
di-n-propyl phosphite,
di-isobutyl phosphite,
di-n-octyl phosphite,
di-decyl phosphite and methyl-ethyl phosphite,
methane phosphonous acid methyl ester,
methane phosphonous acid ethyl ester,
methane phosphonous acid n-butyl ester,
ethane phosphonous acid methyl ester,
ethane phosphonous acid 2-ethylhexyl ester,
benzene phosphonous acid methyl ester,
benzene phosphonous acid isopropyl ester,
dimethyl phosphine oxide,
methylethyl phosphine oxide,
di-n-butyl phosphine oxide,
methyl-phenyl phosphine oxide,
diphenyl phosphine oxide,
dimethyl thiophosphite,
diethyl thiophosphite,
di-isobutyl-thiophosphite,
methane thiophosphonous acid methyl ester and
dimethyl phosphine sulphide,
dimethyl phosphine,
diethyl phosphine,
diphenyl phosphine,
methylphenyl phosphine,
dibutoxy phosphine,
methyl phosphine,
ethyl phosphine and
phenyl phosphine.

The reaction may be initiated by radical-forming substances which are active at temperatures of from about 50° to 300° C, such as organic peroxides and aliphatic azo compounds, as well as by means of high-energy radiation. The following are examples of suitable radical forming agents: dialkyl peroxides, such as di-t-butyl peroxide; diacyl peroxides, such as dibenzoyl peroxide, p-chlorobenzoyl peroxide, 2,4-dichlorobenzoyl peroxide, succinyl peroxide, nonanoyl peroxide and lauroyl peroxide; peroxy esters; such as tert.-butyl peroctoate, tert.-butyl perisobutyrate, tert.-butyl peracetate, tert.-butyl perbenzoate and tert.-butyl perpivolate; peroxyketals and percarbonates; azoisobutyric acid nitrile and azobis-isobutanol-diacetate, as well as UV-radiation, X-rays and gamma rays. Other, equivalent radical-forming agents are well known to those skilled in the art and their suitability may easily be ascertained by simple preliminary tests if necessary.

The reaction between the starting materials is generally carried out by adding the 5-membered, unsaturated phosphine oxide dropwise to the phosphorus-hydrogen compound in a molar ratio of from about 1:0.1 to 1:1. No solvents are required, but an inert solvent may be used if desired. The radical-forming agent is used in a quantity of from 0.1 to 20 mol-%, preferably from 0.5 to 5 mol-%, based on the 5-membered, unsaturated cyclic phosphine oxide, and it is added to the reaction mixture together with the said phosphine oxide. Before the radical-forming agent is added, it may be dissolved in an inert solvent or in one of the reactants. Alternatively, the reactants may be mixed together, with or without the radical-forming agent, and the mixture may then be heated to the reaction temperature. When this temperature is reached, the radical-forming agent, which must have a sufficiently short half-life at this temperature, is intermittently added portion-wise to the mixture.

The reaction temperatures employed are from about 50 to about 300° C, preferably from about 100° to about 200° C. The reaction generally takes from about 0.5 to about 30 hours, depending on the size of the batch and the conditions employed. The reaction time, however, may vary within wide limits.

The reaction is preferably carried out at normal pressure although elevated or reduced pressure may be employed. The atmosphere in which it is carried out may be air or an inert gas.

The reaction products are subsequently partially or completely saponified (as, for example, shown in the Examples herein) and then applied to the insoluble, high molecular weight matrix which contains basic groups, where they are fixed with the formation of ionic bonds. Since the acid-substituted phospholine oxides are water-soluble, the matrix may very easily be charged with catalyst molecules by stirring in an aqueous medium or continuously on a column.

The compounds particularly preferred according to the invention are the isomeric 1-methyl-1-oxo-phospholane-phosphonic acids, 1-methyl-1-oxo-phospholane-phosphinic acid, 1-methyl-1-thio-phospholane-phosphonic acids and 1-methyl-1-oxo-phospholane-thiophosphonic acids.

The catalysts according to the invention may be used for the carbodiimidization of any aliphatic, cycloaliphatic, araliphatic, aromatic or heterocyclic polyisocyanates, such as those described, for example, by W. Siefken in Justus Liebigs Annalen der Chemie, 562, pages 75–136. Examples include ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl-cyclohexane (German Auslegeschrift No. 1,202,785 and U.S. Pat. No. 3,401,190); hexahydrotolylene-2,4- and -2,6-diisocyanate and mixtures of these isomers; hexahydrophenylene-1,3- and/or -1,4-diisocyanate; perhydrodiphenylmethane-2,4'- and/or -4,4'-diisocyanate; phenylene-1,3- and -1,4-diisocyanate; tolylene-2,4- and -2,6-diisocyanate and mixtures of these isomers; diphenylmethane-2,4'- and/or 4,4'-diisocyanate; naphthylene-1,5-diisocyanate; triphenylmethane-4,4'-, 4'''-triisocyanate; polyphenyl-polymethylene polyisocyanates of the type which may be obtained by aniline-formaldehyde condensation followed by phosgenation and which have been described, for example, in British Pat. Nos. 874,430 and 848,671; m- and p-isocyanatophenyl-sulphonyl isocyanates as described in U.S. Pat. No. 3,454,606; perchlorinated aryl polyisocyanates as described in U.S. Pat. No. 3,277,138; polyisocyanates which contain carbodiimide groups as described in U.S. Pat. No. 3,152,162; the diisocyanates described in U.S. Pat. No. 3,492,330; polyisocyanates which contain allophanate groups as described in British Pat. No. 994,890, Belgian Pat. No. 761,626 and published Dutch patent application No. 7,102,524; polyisocyanates which contain isocyanurate groups as described in U.S. Pat. No. 3,001,973, in German Pat. Nos. 1,022,789; 1,222,067 and 1,027,394, and in German Offenlegungsschriften Nos. 1,929,034 and 1,004,048; polyisocyanates which contain urethane groups as described in Belgian Pat. No. 752,261 or in U.S. Pat. No. 3,394,164; polyisocyanates which contain acylated urea groups as described in German Pat. No. 1,230,778; polyisocyanates which contain biuret groups as described, in U.S. Pat. Nos. 3,124,605 and 3,201,372; and in British Pat. No. 889,050; polyisocyanates prepared by telomerization reactions as described in U.S. Pat. No. 3,654,106; polyisocyanates which contain ester groups as described in British Pat.

No. 965,474 and 1,072,956, in U.S. Pat. No. 3,567,763 and in German Pat. No. 1,231,688; reaction products of the above-mentioned isocyanates with acetals as described in German Pat. No. 1,072,385; and polymeric polyisocyanates which contain fatty acid groups as described in U.S. Pat. No. 3,455,883.

The distillation residues which still contain isocyanate groups from the commercial production of isocyanates may also be used, if desired as solutions in one or more of the above-mentioned polyisocyanates. Mixtures of the above-mentioned polyisocyanates may also be used.

The following aromatic polyisocyanates are preferred according to the invention: tolylene-2,4-diisocyanate, tolylene-2,6-diisocyanate and mixtures of these isomers; m-phenylene diisocyanate, p-phenylene diisocyanate and approximately from 10 to 40%, by weight, solutions of biuretization allophanatization, urethanization, trimerization and dimerization products of these polyisocyanates in monomeric polyisocyanates, particularly in monomeric tolylene diisocyanate.

Mixtures of the above-mentioned monomeric polyisocyanates, in particular of tolylene diisocyanate, with approximately from 5 to 95%, by weight, of 4,4'-diisocyanatodiphenylmethane which mixture may be carbodiimidized selectively without reaction of 4,4'-diisocyanatodiphenylmethane diisocyanate, are also preferred. Even small proportions of the carbodiimidized tolylene diisocyanate have the unexpected effect of converting 4,4'-diisocyanatodiphenylmethane, which crystallizes at room temperature, into a liquid mixture which is stable in storage.

Among the aliphatic, cycloaliphatic and araliphatic polyisocyanates, it is preferred to use tetramethylene diisocyanate, pentamethylene diisocyanate, hexamethylene diisocyanate, dicyclohexylmethane diisocyanate, 1-isocyanato-3,3,5-trimethyl-5-isocyanatomethyl cyclohexane, lysine ester diisocyanates and m- and p-xylylene diisocyanates or solutions of their biuretization and dimerization products in the corresponding monomeric polyisocyanates. Again, due to the selective action of the catalysts, practically no carbodiimidization of the higher molecular weight components takes place and consequently cross-linking reactions and the attendant high increases in viscosity do not occur.

Monoisocyanates may, of course, also be carbodiimidized. Suitable monoisocyanates include methyl isocyanate, ethyl isocyanate, propyl isocyanate, isopropyl isocyanate, n-butyl isocyanate, n-hexyl isocyanate, ω-chlorohexyl isocyanate, phenyl isocyanate, tolyl isocyanate, p-chlorophenyl isocyanate, 2,4-dichlorophenyl isocyanate and trifluoromethyl-phenyl isocyanate. The catalysts according to the invention are also capable of selective carbodiimidization of these monoisocyanates in mixtures with higher molecular weight polyisocyanates so that they may be used, for example, for liquefying 4,4'-diisocyanatodiphenylmethane without causing 4,4'-diisocyanatodiphenylmethane to take part in the reaction (in spite of its extremely reactive isocyanate groups).

Carbodiimidization of these monoisocyanates and polyisocyanates or mixtures thereof is carried out by bringing these isocyanates or solutions thereof in inert solvents, such as toluene, xylene, chlorobenzene, o-dichlorobenzene, decalin, dimethylformamide, dimethylacetamide, butyl acetate, carbon tetrachloride, trichloroethylene or tetramethyl urea, into contact with preferably from about 0.2 to about 10%, by weight, and most preferably from about 1 to about 4%, by weight, (based on the isocyanate), of the catalyst-laden matrix at temperatures of from about 50° to about 200° C, preferably at from about 130° to about 185° C. If desired, the reaction may be conducted under pressure. The reaction is most simply carried out by introducing the catalyst into the liquid or dissolved isocyanates with stirring and removing it by decanting or filtration when the desired degree of carbodiimidization has been reached. The degree of conversion may easily be followed by measuring the volume of $CO_2$ formed during the carbodiimidization reaction. The catalysts according to the invention may generally be used from 5 to 10 times without loss of activity. Carbodiimidization may, of course, by carried out continuously in a column provided suitable arrangements are made for unrestricted escape of the $CO_2$ evolved in the reaction.

From extensive analytical investigations of the chemical changes in the catalyst molecule during the carbodiimidization reaction it may be concluded that the phosphine oxides fixed to the matrix by ionic bonds, as well as their thio analogues, are converted into phosphine imine derivatives in a first reaction step, whereupon a 4-membered ring is formed as an intermediate stage by the addition of a further isocyanate molecule, and this ring is finally decomposed into the carbodiimide and at the same time the phosphine oxide group is restored. The reaction scheme is exemplified in FIG. 1.

Figure 1:
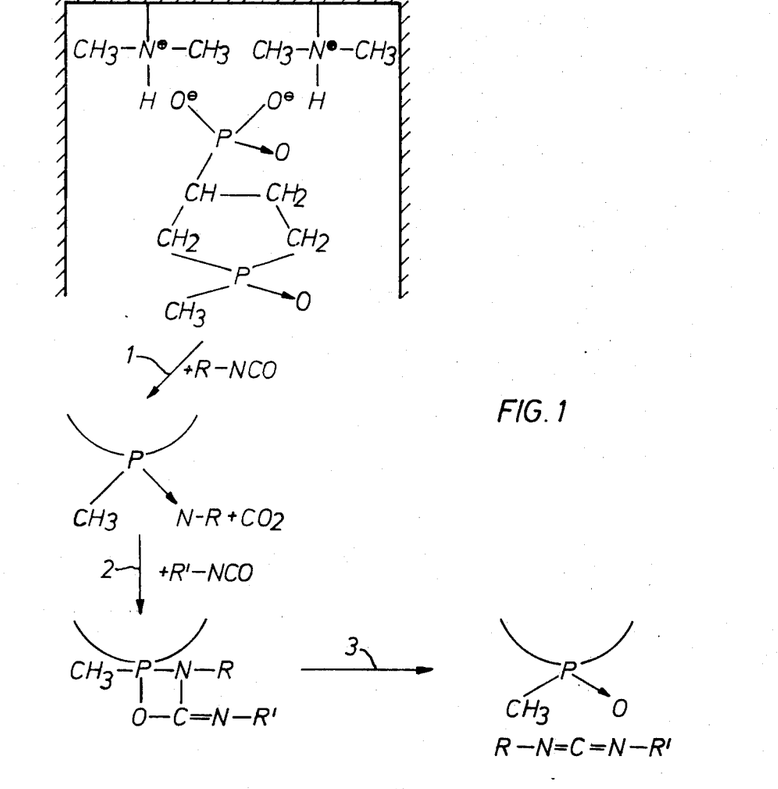
FIG. 1 represents the reaction scheme believed to occur when using the catalysts of the instant invention.

In FIG. 1, the ionically bound catalyst molecule reacts in Step 1 with an isocyanate (R—NCO) to form a phosphine imine derivative and carbon dioxide. In Step 2, the phosphine imine derivative reacts with a second isocyanate (R'—NCO) to form a four member ring. The four member ring subsequently decomposes as shown in Step 3 to form a carbodiimide and the original catalyst. In FIG. 1, R and R', which may be the same or different, each represent a radical which may be obtained by the removal of an isocyanate group from an organic mono- or polyisocyanate.

It is of particular technical interest that, as mentioned above, 4,4'-diisocyanatodiphenylmethane, its isomers and its higher molecular weight multi-nuclear homologues of the type which may be prepared by aniline-formaldehyde condensation followed by phosgenation may, under suitable reaction conditions, (particle size and porosity of the catalyst, temperature and solvent, if used) act as a virtually inert "solvent" for the carbodiimidization of low molecular weight mono- and polyisocyanates because for steric reasons, they are incapable of diffusing to the activepoints of the catalyst matrix. The same applies to other aromatic polyisocyanates of higher molecular weight, such as substituted diphenylmethane diisocyanates, diisocyanatodiphenyl ethers, the hydrogenation products of diphenylmethane diisocyanates, 1-isocyanato-3,3,5-trimethyl-5-isocyanatomethyl cyclohexane, and the like. The catalysts according to the invention may be adjusted to be so selective in their action that even very small quantities of isocyanates, such as phenyl isocyanate, hexamethylene diisocyanate, tetramethylene diisocyanate, lysine methyl ester isocyanate, ω-chlorohexyl isocyanate or tolylene diisocyanates, present in mixtures with such polyisocyanates may be selectively carbodiimidized on the catalyst matrix.

Figure 2:
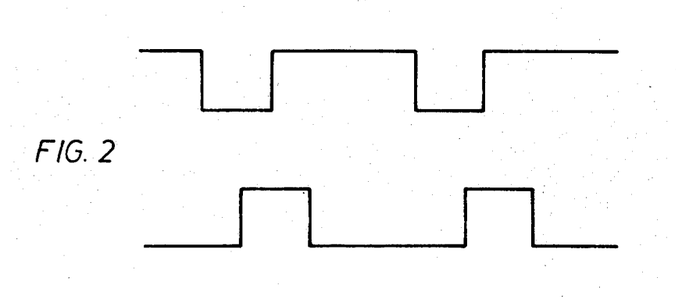
FIG. 2 is a representative of the structure of the catalysts of the instant invention.

FIG. 2 illustrates a single pore in the catalyst matrix. The active centers of the catalyst matrix are located on the pore wall.

The selectivity of the catalysts according to the invention in carbodiimide formation is apparently similar to the function of enzymes in biological reactions. This is evidently due to the fact that the ability of mono- or polyisocyanates to diffuse to the "active centers" or fit into the cavity of the matrix with active centers as indicated in FIG. 2 (so that their isocyanate groups can reach the active center) is limited by their molecular size, depending on the size and numbers of the pores and degree of cross-linking of the high molecular weight matrix.

The diisocyanato-carbodiimides and triisocyanatouretone imines formed in the first stage of the carbodiimidization reaction by addition of another diisocyanate molecule to the diisocyanato-carbodiimide also have great difficulty in diffusing to the active centers of the catalyst matrix on account of their molecular size. It is therefore possible to achieve high degrees of carbodiimidization and yet obtain very low viscosity end products.

In this connection, it is relevant to point out again the technically interesting possibility of selectively converting small quantities of comparatively low molecular weight monoisocyanates or diisocyanates (preferably tolylene diisocyanate) present in polyisocyanates which are crystalline at room temperature (for example, diisocyanatodiphenylmethane or naphthylene diisocyanate) into diisocyanates which contain carbodiimide groups and which are then capable of adding another molecule of polyisocyanate to themselves to form uretone imine structures. Even relatively small proportions (form 3 to 12%, by weight, preferably from 4 to 8%, by weight) of these carbodiimide polyisocyanates or uretone imine polyisocyanates are sufficient to liquefy the polyisocyanate which is crystalline in the pure state.

In spite of the high functionality of the polyisocyanates in the so-called "modified" polyisocyanate mixtures (preferably those based on tolylene diisocyanate) which contain polyisocyanates modified with isocyanurate and/or allophanate and/or biuret and/or urethane groups, the selectivity of the catalysts according to the invention enables more than 20%, by weight, of so-called "monomeric diisocyanates" present in such mixtures to be converted into diisocyanato-carbodiimides or triisocyanato uretone imines without the formation of cross-linked products. This is a particularly surprising result in view of the fact that so-called "homogeneous catalysis" with the aid of the conventional phospholine oxides would immediately result in cross-linking of the highly functional modified polyisocyanates.

As explained above, the selectivity of the high molecular weight catalysts according to the invention depends primarily on the porosity and particle size of the matrix, which may be adjusted within wide limits in known manner by suitable choice of the starting components (in the case of polystyrenes which contain ionic groups, for example, by varying the proportion of styrene to divinyl benzene). In addition, the selectivity of the catalyst may be varied by the addition of a suitable solvent in which the matrix swells (for example xylene in the case of a polystyrene matrix). The activity of the catalyst may, of course, also be increased by raising the temperature. A catalyst which is highly selective towards isocyanates then becomes active towards isocyanates of increasingly larger molecular dimensions as the temperature increases (see Example 23). The selectivity of a given matrix laden with carbodiimidization catalyst may easily be determined by one skilled in the art on the basis of a simple test series in which the catalyst matrix is brought into contact with various monoisocyanates and polyisocyanates at different temperatures. Whether and how rapidly the carbodiimidization reaction proceeds may be ascertained most simply by measuring the carbon dioxide evolved during the reaction.

It is, of course, not absolutely necessary according to the invention to use high molecular weight catalysts which are selective in their action since the carbodiimidized (or only partially carbodiimidized) mono- and/or poly-isocyanates prepared according to the invention may easily be subsequently mixed with other polyisocyanates. This is another method of preparing mixtures which are stable in storage of high molecular weight and/or low molecular weight polyisocyanates with high molecular weight and/or low molecular weight carbodiimides or uretone imines which may contain isocyanate groups.

Since the carbodiimidization catalysts according to the invention differ from the catalysts previously known in being completely removable after the reaction, it is possible to prepare mixtures with any carbodiimide group content. However, according to the invention it is preferred to prepare mixtures which contain from about 3 to about 70%, by weight, preferably from about 10 to about 60%, by weight, of carbodiimides or polycarbodiimides or uretone imines. As is well known in the art, uretone imines are addition compounds of a carbodiimide and an isocyanate. The following polyisocyanate/carbodiimide mixtures are particularly important technically:

a. Mixtures of 100 parts by weight of 4,4'-diisocyanatodiphenylmethane and/or 1,5-naphthylene diisocyanate with from 5 to 30 parts by weight of an equilibrium mixture of the diisocyanatocarbodiimides of tolylene diisocyanate and the corresponding triisocyanato uretone imines.

b. Mixtures of 100 parts by weight of 4,4'-diisocyanatodiphenylmethane and/or 1,5-naphthylene diisocyanate with from 10 to 30 parts by weight of an equilibrium mixture of carbodiimides of phenyl isocyanate, hexamethylene diisocyanate, tetramethylene diisocyanate, cyclohexyl isocyanate or tolyl isocyanate and the uretone imines thereof.

c. Mixtures of 100 parts by weight of tolylene diisocyanate with from 5 to 30 parts by weight of an equilibrium mixture of carbodiimidized phenyl isocyanate or tolyl isocyanate and the uretone imines thereof.

d. Mixtures of 100 parts by weight of modified tolylene diisocyanate containing from 10 to 40%, by weight, of biuret-, allophanate-, urethane- or isocyanuratepolyisocyanates based on tolylene diisocyanate with from 10 to 20 parts by weight of an equilibrium mixture of tolylene diisocyanato carbodiimide and the corresponding triisocyanato uretone imine.

e. Mixtures of 100 parts by weight of biuret polyisocyanates of hexamethylene diisocyanate (preferably reaction products of 1 mol of water and from about 2 to 3 mol of hexamethylene diisocyanate) with from 10 to 30 parts by weight of the equilibrium mixture of the carbodiimide of hexamethylene diisocyanate and the corresponding uretone imine polyisocyanate.

f. Mixtures of 100 parts by weight of α,ω-diisocyanatoprepolymers (obtained from 1 mol of α,ω-dihydroxy polyesters or polyethers of the type described in more detail below and from 1.4 to 2.5, preferably from 1.6 to 2, mol of tolylene diisocyanate, diisocyanatodiphenylmethane or hexamethylene diisocyanate) with from 5 to 30 parts by weight of the equilibrium mixture of the carbodiimide or carbodiimide diisocyanates and the corresponding uretone imine polyisocyanates of phenyl isocyanate, tolyl isocyanate, tetramethylene diisocyanate, hexamethylene diisocyanate or tolylene diisocyanate.

The carbodiimides prepared with the aid of the catalysts according to the invention, which carbodiimides may contain isocyanate groups, and their solutions in polyisocyanates which are free from carbodiimide groups are valuable starting materials for the diisocyanate polyaddition process. They may be used for the manufacture of various hard to elastic and, if desired, cellular plastics and for the production of lacquers, coatings, foils and shaped products. Polyurethanes produced in this way contain carbodiimide groups and uretone imine groups (= masked carbodiimide groups) which are firmly built into the polymer molecule and which act as age resistors against the hydrolysis of ester bonds, as well as reducing the flammability of the substances in which they are incorporated.

Production of the polyurethanes is carried out in conventional manner by reaction of the polyisocyanate mixtures with high molecular weight and, if desired, also low molecular weight compounds which contain at least two hydrogen atoms which are reactive with isocyanate.

The following examples serve to illustrate the present invention. The quantities given denote parts by weight or percentages by weight unless otherwise indicated.

EXAMPLE 1

Preparation of 1-methyl-1-oxophospholane phosphonic acid dimethyl ester.

A total of 117 g of an approximately 1:1 mixture of 1-methyl-1-oxophospholine-2 and 1-methyl-1-oxophospholine-3 is added dropwise in the course of 1 hour to 550 g of dimethyl phosphite in a 1 liter glass flask at a temperature of from 113° to 115° C with vigorous stirring. At the same time, a suspension of 8 g of dibenzoyl peroxide in silicone oil is introduced gradually in the course of the reaction time. All the materials used have been freed from traces of oxygen by repeated evacuation and flushing with nitrogen.

After termination of the reaction, the dimethyl phosphite is distilled off under vacuum, followed by unreacted 1-methyl-1-oxophospholine (81 g) which consists of approximately equal parts of the two isomers. Distillation of the residue yields 28 g of an almost colorless oil (bp$_{0.5mm}$: 185° to 190° C) which solidifies in the receiver to a white crystalline paste which becomes liquid again at temperatures of from 40° to 55° C.

Analysis: $C_7H_{16}O_4P_2$: Calculated: 27.4% P; 37.2% C; 7.1% H; Observed: 28.0% P; 36.8% C; 7.0% H.

According to gaschromatographic analysis, four different isomers are obtained.

Acid saponification of this compound leads to the isomeric 1-methyl-1-oxophospholane-phosphonic acids which have the following idealized constitution:

(see Example 7)

These isomers may be fixed to basic, insoluble matrices in large quantities (from 30 to 50%, by weight) in aqueous solution or in inert organic solvents. This reaction is accompanied by polyammonium salt formation or by neutralization on hydroxyl apatites.

EXAMPLE 2

Preparation of 1-methyl-1-oxophospholane phosphonic acid dimethyl ester.

2900 g of 1-methyl-1-oxophospholine (mixtures of isomers as in Example 1) and 200 g of t-butyl peroctoate dissolved in 750 ml of dimethyl phosphite are added dropwise to 5500 g of dimethyl phosphite at from 110° to 115° C with stirring in the course of 4 hours. The reaction is carried out under a nitrogen atmosphere. After removal of excess dimethyl phosphite and unreacted phospholine oxide (170 g) by distillation, a residue of 5250 g of 1-methyl-1-oxophospholane phosphonic acid dimethyl ester (93% of the theoretical yield) which solidifies at from 50° to 60° C is obtained.

Analysis: $C_7H_{16}O_4P_2$: Calculated: 27.4% P; 37.2% C; 7.1% H; Observed: 27.2% P; 37.0% C; 7.0% H.

EXAMPLE 3

Preparation of 1-methyl-1-oxophospholane phosphonic acid diethyl ester.

1380 g of diethyl phosphite are heated to 160° C under nitrogen. 348 g of 1-methyl-1-oxophospholine and 18 g of t-butyl peroxide are simultaneously added dropwise at this temperature in the course of two hours with vigorous stirring. Any unreacted diethyl phosphite is distilled off under vacuum. The residue consists of 755 g of a yellow liquid which according to elemental analysis and NMR has the composition of a 1-methyl-1-oxophospholane-phosphonic acid diethyl ester. The substance may be distilled off at from 220° to 225° C/1 Torr with slight decomposition.

Analysis: $C_9H_{20}O_4P_2$: Calculated: 24.4% P; 42.5% C; 7.9% H; Observed: 24.2% P; 42.8% C; 7.8% H.

EXAMPLE 4

Preparation of 1-methyl-1-oxophospholanyl methyl phosphinic acid methyl ester.

6 g of t-butyl peroctoate in 30 g of methane phosphonous acid methyl ester and 116 g of 1-methyl-1-oxophospholine are added dropwise to 282 g of oxygen-free methane phosphonous acid methyl ester at 120° C with stirring. The reaction time is 90 minutes. Excess methane phosphonous acid methyl ester and a small quantity of 1-methyl-oxophospholine are distilled off. The residue, consisting of 205 g of 1-methyl-1-oxophospholanylmethyl phosphinic acid methyl ester, is purified by distillation under vacuum (bp $_{1mm}$:210° to 220° C) to yield 186 g of pure product which solidifies very slowly to stellate crystals which begin to reliquefy at 70° C. Acid saponification leads to isomeric 1-methyl-1- oxophospholanyl-methyl phosphinic acids of the idealized constitution:

EXAMPLE 5

Preparation of 1-methyl-1-thiophospholane phosphonic acid dimethyl ester.

132 g of 1-methyl-1-thiophospholine are added dropwise to 550 g of dimethyl phosphite in the course of 1 hour at a temperature of from 115° to 120° C in a nitrogen atmosphere. 10 g of t-butyl peroctoate in 40 ml of dimethyl phosphite are introduced over the same period of time. Excess dimethyl phosphite and part of the unreacted 1-methyl-1-thiophospholine are recovered by distillation up to a sump temperature of 130° C at 1 mm.Hg. The residue (148 g) consists of 1-methyl-1-thiophospholane phosphonic acid dimethyl ester contaminated with approximately 10% of 1-methyl-1-thiophospholine. When this residue is dissolved in 500 ml of water and extracted with 40 ml of trichloroethylene, an aqueous solution which is free from 1-methyl-1-thiophospholine is obtained. 118 g of 1-methyl-1-thiophospholane phosphonic acid dimethyl ester may be reextracted from this solution with chloroform. Acid saponification of the extracted compound yields isomeric 1-methyl-1-thiophospholane phosphonic acids which have the idealized constitution:

EXAMPLE 6

Preparation of 1-methyl-1-oxophospholane thiophosphonic acid dimethyl ester.

58 g of 1-methyl-1-oxophospholine and 3 g of t-butyl peroctoate in 5 ml of 1-methyl-1-oxophosholine are simultaneously added dropwise to 132 g of dimethyl thiophosphite with stirring in a nitrogen atmosphere. The reaction temperature is from 120° to 125° C. After removal of the dimethyl thiophosphite and a small quantity of 1-methyl-1-oxophospholine by distillation, the residue obtained consists of 121 g of 1-methyl-1-oxophospholane thiophosphonic acid dimethyl ester which solidifies in a crystalline form on cooling. The colorless crystals begin to reliquefy at 80° C. Acid saponification of this compound results in isomers of the following constitution:

EXAMPLE 7

Preparation of 1-methyl-1-oxophospholane phosphonic acid.

226 g of 1-methyl-1-oxophospholane phosphonic acid dimethyl ester are heated to boiling with 500 g of water and 300 g of 36% hydrochloric acid for three days. Methyl chloride and methanol distil off. The residue is evaporated under vacuum, taken up six times with 200 g of water and re-evaporated. No more chloride may then be detected in the residue which consists of pure 1-methyl-1-oxophospholane phosphonic acid. Equivalent weight found: 98.2; calculated: 99.

Saponification of the compounds from Examples 3 to 6 may be carried out in analogous manner. Fixation of the free acids to the basic matrices can be carried out by the procedure employed in Examples 8 to 13.

EXAMPLE 8

This Example and the following Examples 9 to 13 describe procedures which are respresentative of the numerous possible methods of ionic fixation of the catalysts to insoluble basic matrices.

200 ml of a so-called "weak basic" anion exchanger based on a polystyrene containing —N—(CH$_3$)$_2$-groups, which has been regenerated with sodium hydroxide solution (and which is produced according to Example 6 of U.S. Pat. No. 3,006,866, but contains only five percent by weight of divinyl benzene), are treated in a column with 30 g of 1-methyl-1-oxophospholane phosphonic acid in 300 ml of water. The exchanger resin has a macroporous structure and a total capacity of 1.9 val/l. When the resin has been laden with 1-methyl-1-oxophospholane phosphonic acid, it is washed with 3 l of water and dried in a vacuum at 90° C. The dried exchanger resin contains approximately 30%, by weight, of 1-methyl-1-oxophospholane phosphonic acid.

EXAMPLE 9

Example 8 is repeated with 300 ml of a macroporous, strongly basic commercial anion exchanger based on polystyrene which has a total capacity of 1.2 val/l and contains trimethyl ammonium groups (produced according to Example 2 of U.S. Pat. No. 3,006,866). A resin containing about 20%, by weight, of 1-methyl-1-oxophospholane phosphonic acid is obtained.

EXAMPLE 10

71 g of 1-methyl-1-oxophospholane phosphonic acid are added in the form of a 14% solution in water to 500 ml of a strongly basic, polystyrene-based exchanger resin which has been regenerated with sodium hydroxide solution. The resin has a macroporous structure and a total capacity of 1.2 val/l and contains dimethylhydroxyethyl ammonium ions as anchoring groups in the solid phase (produced according to Example 5 of U.S. Pat. No. 3,006,866, utilizing the polystyrene of Example 2 of that patent). After a contact time of 30 minutes, the charged resin is washed three times, each time with 1 l of water, and then dried in a vacuum. About 30 g of 1-methyl-1-oxophospholane phosphonic acid are bound to 100 g of dried resin.

EXAMPLE 11

500 ml of a medium basic exchanger in the form of a gel based on a polycondensate of epichlorohydrin and triethylene tetramine containing trimethyl ammonium groups bound in the solid phase in addition to dimethylamine groups are regenerated with sodium hydroxide solution and washed with water until neutral. The exchanger, which has a total capacity of 2.2 val/l (and is produced according to U.S. Pat. No. 3,725,313) is brought into contact with 600 ml of an 18% aqueous 1-methyl-1-oxophospholane phosphonic acid solution which still contains 0.16 mol of hydrochloric acid. After a contact time of 2 hours, the aqueous phase is removed and the solid phase is washed four times with 1 l portions of water and then dried in a vacuum. The dry preparation contains 36% of 1-methyl-1-oxophospholane phosphonic acid.

EXAMPLE 12

The macroporous, strongly basic anion exchanger of Example 9, which contains trimethyl ammonium ions as anchoring groups, is charged with the following compounds instead of with 1-methyl-1-oxophospholane phosphonic acid in the same way as described in Example 9:

a. 1-methyl-1-oxophospholane phosphinic acid,
b. 1-methyl-1-thiophospholane phosphonic acid,
c. 1-methyl-1-oxophospholane thiophosphonic acid.

The following quantities are fixed:

a. 32 parts, by weight, to 68 parts, by weight, of matrix,
b. 29 parts, by weight, to 71 parts, by weight, of matrix.
c. 27 parts, by weight, to 73 parts, by weight, of matrix.

EXAMPLE 13

By employing the procedure described in Example 8, the compound corresponding to the following formula:

(I)

may be fixed in the quantities, by weight, indicated below by way of quaternary ammonium salt groups to various basic matrices of differing porosity which act as anion exchangers:

A. About 36 parts, by weight, of compound (I) are fixed to 64 parts, by weight, of a medium basic anion exchanger in the form of a gel based on a phenol-formaldehyde resin which is only slightly porous and contains the following anchoring group:

The resin was prepared as follows: 1 mol of phenol and 3 mol of formaldehyde were first condensed for 4 hours in 0,5 l of water at pH=1 and at a temperature of 80° C, using hydrochloric acid as catalyst. The unsoluble precipitate was filtered off and dried. The condensation product was then chloromethylated under reflux with 1.5 mol of paraformaldehyde and gaseous hydrochloric acid for 4 hours in 0.5 l of carbon tetrachloride in conventional manner.

In a third stage, the product obtained from the second stage was dissolved in toluene and reacted with an excess of gaseous dimethylamine at 100° C in an autoclave for 2 hours. The pulverulent material obtained was finally washed free from chloride with normal sodium hydroxide solution.

B. About 30 parts, by weight, of compound (1) were fixed to 70 parts, by weight, of a medium basic, macroporous anion exchanger in the form of a gel based on a phenolformaldehyde-urea-formaldehyde polycondensate which contained >N-CH$_3$-groups as anchoring groups.

The polycondensate had been prepared by reacting 1 mol of phenol, 1 mol of:

and 5 mol of formaldehyde for 2 hours in 800 ml of water at 80° C and pH=1 with the aid of hydrochloric acid as catalyst and then washing the reaction product free from chloride with normal sodium hydroxide solution.

C. About 30 parts, by weight, of compound (I) are fixed to 70 parts, by weight, of a very strongly basic macroporous anion exchanger based on polystyrene containing:

as anchoring groups (the exchanger of Example 10).

D. Approximately 23 parts, by weight, of compound (I) are fixed to 77 parts, by weight, of a very strongly basic, not macroporous anion exchanger based on polystyrene containing $-_+N(CH_3)_3$ groups as anchoring groups (produced according to Example 2 of U.S. Pat. No. 3,006,866, but without using the white spirit and containing only 5% by weight divinyl benzene.

E. Approximately 32 parts, by weight, of compound (I) are fixed to 68 parts, by weight, of a very strongly basic, not macroporous anion exchanger based on polystyrene containing $-_+N(CH_3)_3$ groups as anchoring groups.

Matrices based on polystyrene may be produced with differing porosities by copolymerizing styrene with from 2 to 6% by weight, of divinyl benzene by the method of bead polymerization (Houben-Weyl, Volume XIV/1 (1961), Makromolekulare Stoffe, pages 146, 406, 425, 840, 1122 and 1129). The bead polymers obtained are subsequently chloromethylated (Houben-Weyl, Volume XIV/2, Makromolekulare Stoffe (1963), page 667) to convert them into cross-linked polystyrene beads containing —CH₂Cl— groups. Reaction of this polystyrene containing reactive chloromethyl groups with: (CH₃)₂N—CH₂CH₂OH results in carriers like matric (C) while reaction with trimethylamine results in carriers like matrices (D) and (E). See also U.S. Pat. No. 3,006,866.

F. Approximately 30 parts, by weight, of compound (I) are fixed to 70 parts, by weight, of a very strongly basic anion exchanger based on polystyrene which has been prepared according to Example 2 of U.S. Pat. No. 3,006,866 (but containing only 5% by weight, of divinylbenzene) which has a macroporous structure and contains —₊N(CH₃)₃— anchoring groups.

Matrix (F) has a pore volume of about 55%, a pore surface of from 40 to 50 m² per gram of dry substance and an average pore diameter of from about 200 to 400 Angstrom units. The particle size is in the region of from 0.3 to 1.5 mm. The capacity of matrix (F) to swell in aliphatic polyisocyanates is from about 30 to 40 vol.-%, measured by the increase in volume of the beads, and its capacity to swell in aromatic isocyanates, such as phenyl isocyanate or tolylene-2,4-diisocyanate, is from approximately 90 to 130 vol.%. The matrix contains 2 $\times 10^{18}$ basic groups per mg of dry substance.

G. About 20 parts, by weight, of compound (I) are fixed to 80 parts, by weight, of a polyethylene imine granulate which has been cross-linked with Cl—CH₂—$_{CH2}$—CH₂—Cl. The granulate had been prepared in the following manner: 200 parts, by weight, of polyethylene imine (average molecular weight about 6000) were dissolved in 600 parts, by weight, of water. 80 parts, by weight, of dichlorobutane were added and the reaction was carried out in heterogenous phase by heating the composition for 2 hours at 130° C in an autoclave. The rubber-like product thus obtained was filtered off and carefully washed with normal sodium hydroxide solution and water.

H. Approximately 5 parts, by weight, of compound (I) are fixed to 95 parts, by weight of a natural, inorganic apatite powder containing hydroxyl groups when the powder is exposed to the action of compound (I) for 30 hours.

I. Approximately 15 parts, by weight, of compound (I) are fixed to approximately 80 parts, by weight, of an insoluble, cross-linked, basic polyurea powder which has been prepared by reacting 1 mol of a biuret triisocyanate of idealized structure:

with 1 mol of:

in 600 ml of xylene as dispersing agent at 30° C.

J. Approximately 25 parts, by weight, of compound (I) are fixed to approximately 75 parts, by weight, of a basic polyurethane powder which has been prepared from 1 mol of hexamethylene diisocyanate and 1 mol of:

by heating the two starting components for 2 hours at 60° C in 600 ml of xylene as dispersing agent.

K. Approximately 15 parts, by weight, of compound (I) are fixed to approximately 84 parts, by weight, of a cross-linked basic polyepoxide granulate. The granulate had been prepared by heating a mixture comprising 1 mol of:

and 1 mol of:

for 4 hours at 90° C in 800 ml of xylene as dispersing agent. The coarse precipitate thus obtained was filtered off and dried.

L. Approximately 12 parts by weight of compound (I) are fixed to approximately 88 parts by weight, of a basic, granular copolymer which has been prepared by radical-initiated emulsion copolymerization reacting 1 mol of styrene and 0.5 mol of:

for 4 hours at 65° C in 1 l of water, using benzoyl peroxide as starter and 4 g of a high molecular weight polyethylene oxide as emulsifier.

M. Approximately 15 parts, by weight, of compound (I) are fixed to approximately 85 parts by weight of a polymethylene urea powder containing basic groups, which was prepared from 1 mol of 2 mol of formaldehyde and 1 mol of:

by condensation in 0.6 liters of hydrochloric acid (at pH=1 and room temperature) and subsequently washed free from chloride by vigorous treatment with normal NaOH.

N. 17 parts by weight of compound (I) are added to 83 parts by weight of a urethane modified polyvinyl alcohol resin containing basic groups. The resin was prepared by reacting for 4 hours at 50° C, 88 g of polyvinyl alcohol (average molecular weight about 20,000) and 1 mol of:

in 500 ml of dimethylformamide as dispersing agent, using 0.4 g of tin(II) octoate as catalyst.

By addition of water, the resin was precipitated from the dimethylformamide, followed by filtering off and drying.

O. 20 parts by weight of compound (I) are fixed to 80 parts by weight, of a pulverulent, basic polyamide which was prepared from 1 mol of adipic acid, 1 mol of hexamethylene diamine and 1 mol:

by a 6 hours' solvent-free condensation under nitrogen at 220° C.

P. 35 parts by weight of compound (I) are fixed to 65 parts by weight of a polyguanidine in the form of a coarse powder. The polyguanidine was prepared from a high cross-linked polycarbodiimide of 4,4'-diisocyanatodiphenylmethane (obtained by polymerizing 4,4'-diisocyanatodiphenylmethane in the conventional manner in the presence of catalytical amounts of phospholine oxide, followed by boiling the cured, cross-linked resin with aqueous alcohol to remove all traces of the catalyst) in an atoclave by chemical addition of approxymately equivalent quantities of dimethylamine (a), methylamine (b), or ethylamine (c) in xylene as dispersing agent at 160° C and 10 excess atmospheres and which in the case of (a) contain the following basic groups in the polymer matrix:

x = approx. 3-12 as anchoring group for phospholinic, phosphonic, phosphinic or thiophosphonic acids.

Q. 19 parts by weight of compound (I) are fixed to 81 parts by weight of an insoluble matrix which has been cross-linked through polysiloxane groups. The matrix was prepared by the reaction of 4 mol of tolylene-2,4-diisocyanate, 1 mol of:

4 mol of $C_6H_{11}$—NH—$CH_2$—Si(—$OC_2H_5$)$_3$ in 600 ml of xylene as dispersing agent at 70° C. By distilling off the xylene from the clear solution thus obtained by water vapor distillation, the linear polyurethane was subsequently cross-linked three-dimensionally across siloxane groups.

R. (1) 25 parts by weight of compound (I) are fixed to 78 parts by weight of an insoluble matrix which has a high siloxane group content and which was prepared by adding a mixture comprising 1 mol of:

2 mol of:

dropwise in the course of ¼ hour to a mixture of ½ l methanol and ½ l of water at 50° C followed by stirring the reaction mixture for 4 hours at 50° C, filtering off the precipitate and drying.

2. 40 parts by weight of compound (I) are fixed to 78 parts by weight of an analogous insoluble matrix with a high siloxane group content which has been prepared by hydrolysis of 1 mol of:

in an analogous manner as described above.

3. 30 parts by weight of compound (I) are fixed to 78 parts by weight of an analogous matrix prepared by cohydrolysis of 1 mol of $(CH_3)_2N$—$CH_2$—Si($OC_2H_5$)$_3$ and 4 mol of Si (-$OC_2H_5$)$_4$ as described above.

EXAMPLE 14

The insoluble catalysts (A) to (R) described in Example 13 are used for the heterogeneous catalysis of carbodiimidization of 2088 parts by weight (12 mol) of an isomeric mixture which is liquid at room temperature of 80% by weight of tolylene-2,4-diisocyanate and 20% by weight of tolylene 2,6-diisocyanate. The insoluble catalyst is used in each case in the quantity by weight indicated in the following Table 2.

The catalyst is kept in suspension in the polyisocyanate by vigorous stirring at a temperature of from 148° to 151° C. Carbodiimidization sets in very rapidly and its velocity is measured with a $CO_2$ gas meter. In all 21 Examples set out in the Table, carbodiimidization is continued to the same degree of conversion by stopping the reaction by simple removal of the catalyst by filtration when 76 l of $CO_2$ have been evolved. The reaction times given in the Table are a measure of the differences in the velocity of carbodiimidization which depends on the rate of diffusion of the diisocyanate to the active center of the matrix and hence on the porosity of the matrix.

TABLE 2

| Catalyst | Parts by weight of catalyst | Quantity of $CO_2$ evolved in liters | $-N=C=N-$ equivalents | Reaction time in hours | % NCO of the solution | Viscosity in cP/20° C |
|---|---|---|---|---|---|---|
| A (polycondensate matrix) | 28 | 76 | 3.4 | 8 | 34.8 | 48 |
| B (polycondensate matrix) | 30 | 76 | 3.4 | 9 | 35.1 | 55 |
| C (polymer matrix) | 24 | 76 | 3.4 | 4 | 34.8 | 46 |
| D (polymer matrix) | 24 | 76 | 3.4 | 9 | 34.6 | 51 |
| E (polymer matrix) | 24 | 76 | 3.4 | 10 | 35 | 65 |
| F (polymer matrix) | 24 | 76 | 3.4 | 5.5 | 34.9 | 46 |
| G (polycondensate matrix) | 30 | 76 | 3.4 | 11 | 35.1 | 45 |
| H (Apatite) | 60 | 76 | 3.4 | 24 | 35.8 | 42 |
| I (polyaddition matrix) | 30 | 76 | 3.4 | 9 | 35.1 | 64 |
| J (polyaddition matrix) | 32 | 76 | 3.4 | 10 | 34.7 | 49 |
| K (polyaddition matrix) | 40 | 76 | 3.4 | 8 | 35.5 | 42 |
| L (polymer matrix) | 45 | 76 | 3.4 | 7 | 34.4 | 70 |
| M (polycondensate matrix) | 40 | 76 | 3.4 | 7 | 35.2 | 54 |
| N (polycondensate matrix) | 30 | 76 | 3.4 | 8 | 34.2 | 74 |
| O (polycondensate matrix) | 35 | 76 | 3.4 | 8.5 | 35.2 | 42 |
| P (polyaddition matrix) | 28 | 76 | 3.4 | 9.8 | 34.7 | 55 |
| Q (polyaddition polycondensation matrix) containing Si) | 32 | 76 | 3.4 | 12 | 35.4 | 42 |
| $R_1$ (polycondensate matrix containing silicon) | 15 | 76 | 3.4 | 14 | 34.9 | 48 |
| $R_2$ | 12 | 76 | 3.4 | 8 | 35.8 | 42 |
| $R_3$ | 14 | 76 | 3.4 | 9 | 36.1 | 39 |

Determination of the quantity of $CO_2$ evolved at 20° C and of the isocyanate content and spectroscopic investigations indicate in all cases that approximately 53.5% of the tolylene diisocyante initially react to form the diisocyanato-carbondiimide of the formula:

(and the ocrresponding 2,6-isomers, respectively) of which at least 65-70% are then converted into the uretone imine triisocyanate of e.g. the following constitution:

by the free tolylene diisocyanate still present. In all the 21 examples, therefore, the solutions contain at least about 65-70% by weight of partially masked carbodiimide diisocyantes in tolylene diisocyanate.

The solutions of diisocyanate carbodiimides prepeared in this way, which are in equilibrium with triisocyanate uretone imines, are all completely stable over a period of 6 months without developing any $CO_2$ pressure when stored in closed vessels.

EXAMPLE 14 A (comparison experiment)

If the method described in Example 14 is used for the formation of isocyanato carbodiimides and isocyanato-polycarbodiimides, but 4 parts by weight of isomeric phospholine oxides of the following formulae:

are used as catalyst for homogeneous catalysis, vigorous carbodiimide formation sets in at room temperature. However, the reaction cannot be stopped and therefore cannot be used for preparing stable solutions of carbodiimide diisocyanates and uretone imine triisocyanates in excess monomeric polyisocyanate. After only 2 hours, the solution has solidified to a brittle foam. If, for comparison, from 1 to 5% by weight of $POCl_3$, zinc chloride, dimethyl carbamic acid chloride, $PCl_5$, aluminum chloride, $BF_3$ or gaseous HCl are added to the solution as inhibitors after approximately 76 liters of $CO_2$ (determined at 20° C) have been liberated, subsequent formation of carbodiimide is slowed down, but the isocyanate content of the solution continues to decrease with continuous evolution of $CO_2$ and increase in viscosity. These solutions cannot be transported in closed vessels and are considerable sources of danger due to the development of high $CO_2$ pressures which are likely to cause spontaneous explosion of the vessels.

EXAMPLE 15

The procedure is exactly the same as described in Example 13, but when catalyst (F) has been used once, it is used a second time and the evolution of $CO_2$ is plotted against time. Practically the same $CO_2$ curve is obtained as in the first experiment. Even after 5 times, the catalyst may be used again provided that after the catalyst has been filtered off, its porous structure is not destroyed by the action of atmospheric moisture and formation of polyurea.

EXAMPLE 16

This example demonstrates the surprising selectivity of catalyst (F) described in Example 13 (matrix on a basis of polystyrene with strongly basic anchoring groups).

500 parts by weight of 4,4'-diisocyanatodiphenyl methane (2 mol) and 34.8 parts by weight (0.2 mol) of a mixture of 80 parts by weight of tolylene-2,4-diisocyanate and 20 parts by weight of tolylene-2,6-diisocyanate are heated to 165° C for 35 minutes with 4 parts by weight of catalyst (F) the preparation of which was described in Example 13. Carbodiimidization of the tolylene diisocyanate proceeds selectively and a solution of about 7% by weight of the compound:

(and the corresponding 2,6-isomers, respectively) in 4,4'-diisocyanatodiphenylmethane is obtained. This solution has the remarkably low viscosity of only about 68 cP/20° C and an isocyanate content of about 31.5%.

After equilibration with the diisocyanatodiphenylmethane more than 70% by weight of the diisocyanatocarbodiimide formed have been converted to a triisocyanatouretone imine of the idealized formula:

It is surprisingly found that even at concentrations of only about 7% by weight the diisocyanato-carbodiimide prepared according to the invention and its uretone imine triisocyanate are capable of liquefying 4,4'-diisocyanatodiphenylmethane which is crystalline at room temperature.

EXAMPLE 17

As has been found in Example 16, carbodiimidization of tolylene diisocyanate with the aid of catalyst (F) from Example 13 proceeds strictly selectively at a temperature of 165° C. When the temperature is raised to 181° C, the pore size increases, partly due to thermal expansion and partly due to the increased degree of swelling, with the result that carbodiimidization no longer proceeds selectively and part of the diphenylmethane diisocyanate is also carbodiimidized. The carbodiimide polyisocyanates of 4,4'-diisocyanatodiphenylmethane are therefore obtained in addition to polycarbodiimide polyisocyanates of tolylene diisocyanate.

Thus, for example, when a mixture of 500 parts by weight (2 mol) of 4,4'-diisocyanatodiphenylmethane, 34.8 parts by weight (0.2 mol) of tolylene-2,4-diisocyanate and 4 parts by weight of catalyst (F) is reacted at from 178° to 181° C, 12.6 liters of $CO_2$ are liberated in the course of 4 hours. The reaction products consist of approximately 0.1 mol of:

and the corresponding uretone imine triisocyanates and approximately 0.46 mol of diisocyanate-carbodiimides of the following constitution:

of which at least 70% react with 1.18 mol of the 4,4'-diisocyanatodiphenylmethane still present to produce uretone imine triisocyanates of the idealized constitution:

A polyisocyanate mixture which is liquid at room temperature and has an isocyanate content of 23.5% and a viscosity of 1182 cP/20° C is obtained. It has excellent storage stability. It contains approximately 57% by weight of diisocyanato-carbodiimides and uretone imine triisocyanates of the idealized constitutions indicated above.

EXAMPLE 18

The procedure is exactly the same as in Example 16, but the 0.2 mol of tolylene diisocyanate is replaced by:

a. 0.2 mol of phenyl isocyanate,
b. 0.2 mol of 4-isocyanatotoluene,
c. 0.2 mol of benzyl isocyanate,
d. 0.2 mol of ω-chlorohexyl isocyanate and
e. 0.2 mol of n-butyl isocyanate.

Selective carbodiimidization of the monoisocyanates described under (a) to (e) may be carried out as in Example 16 at a temperature of from 162° to 165° C, and again it is found that 4,4'-diisocyanatodiphenylmethane may be liquefied at room temperature.

The carbodiimides formed, in particular the carbodiimides R—N=C=N—R obtained from the aromatic monoisocyanate (a) and (b), wherein R represents phenyl, tolyl, benzyl, chlorohexyl or n-butyl, undergo an addition reaction with 4,4'-diisocyanato-diphenylmethane in accordance with the idealized reaction scheme indicated below to form the uretone imine monoisocyanate of the formula:

which is both a masked monocarbodiimide and a masked diisocyanate.

Stable solutions of polyisocyanate mixtures which contain carbodiimide groups or masked carbodiimide groups and have the following isocyanate contents and viscosities are obtained:

| | |
|---|---|
| (a) 30.1 %NCO | $\eta = 61$ cP |
| (b) 29.4 %NCO | $\eta = 75$ cP |
| (c) 28.5 %NCO | $\eta = 980$ cP |
| (d) 29.1 %NCO | $\eta = 885$ cP |
| (e) 30.5 %NCO | $\eta = 730$ cP |

EXAMPLE 19

The selectivity of carbodiimidization may again be eliminated by simply increasing the temperature from about 160° to 165° C to 180° to 185° C so as to increase the pore size of the catalyst (F) due to thermal expansion and increased swelling in the diisocyanate mixture used. This is illustrated by the following method:

500 parts by weight of 4,4'-diisocyanatodiphenylmethane (2 mol) are mixed with 23.8 parts by weight of phenyl isocyanate (0.2 mol) and heated to 184° C for 3 hours with 4 parts by weight of catalyst (F) the preparation of which was described in Example 13. 12.6 liters of $CO_2$ (measured at 20° C) are evolved in the course of the reaction. Not only is phenyl isocyanate converted into diphenyl carbodiimide and the corresponding uretone imine monoisocyanates of 4,4'-diisocyanatodiphenylmethan, but a proportion of about 0.4 mol of 4,4'-diisocyanatodiphenylmethane is also converted into the corresponding diisocyanato-carbodiimide and its uretone imine triisocyanate.

The products of the process are obtained in the form of stable solutions in 4,4'-diisocyanatodiphenylmethane which will no longer crystallize at room temperature. Isocyanate content of the solution is 21.84%, while viscosity at 25° C is 428 cP.

EXAMPLE 20

This example illustrates the interesting finding that even commercial solutions contain about 30 parts by weight of (a) biuret polyisocyanates which according to gaschromatographic analysis are composed of about 35% by weight of triisocyanates, about 25% by weight of tetraisocyanates, about 19% by weight of pentaisocyanates and about 28% by weight of highly functional biuret polyisocyanates which may be linked through uretdione groups or (b) allophanate polyisocyanates or (c) isocyanurate polyisocyanates of tolylene-2,4-diioscyanate in about 70 parts by weight of mono- meric tolylene diisocyanate my selectively carbodiimidized by means of the catalysts according to the invention. The higher molecular weight biuret polyisocyanates, e.g. those of the constitution:

and their higher molecular weight homologues (a) or allophanate polyisocyanates which e.g. have the idealized constitution:

and their higher molecular weight homologues (b) or isocyanurate polyisocyanates (c) which have the idealized constitution:

and higher molecular weight multi-nuclear polyisocyanurate polyisocyanates are obviously sterically hindered from reaching the active centers of the polymer matrix (F) and they are therefore not carbodiimidized. The only isocyanate which can easily diffuse to the active center of the matrix to enter into the carbodiimide reaction is tolylene diisocyanate, which is present as "solvent", and tolylene-2,4-diisocyanate, which has its isocyanate group in the para-position, can do so most rapidly.

The carbodiimidization reaction presumably proceeds in the following stages:

1. primary formation of solid phosphine imine with liberation of $CO_2$ at the matrix,
2. addition of another molecule of tolylene diisocyanate to the insoluble phosphine imine of the matrix,
3. decomposition of the resulting 4-membered ring into carbodiimide and
4. detachment of the carbodiimide from the matrix and simultaneous reformation of the phospholine oxide or phosphine matrix.

The approximately 30% solutions of the abovementioned polyisocyanates (a) to (c) in tolylene diisocyanate (ratio of isomers 2,4:2,6 = 80:20) have the following isocyanate contents and viscosities:

| | |
|---|---|
| (a) 41.5 % NCO | $\eta$ 20° C = 212 cP |
| (b) 39.8 % NCO | $\eta$ 20° C = 320 cP |
| (c) 38.7 % NCO | $\eta$ 20° C = 290 cP |

The action of 24 parts by weight of catalyst (F) on 2000 parts by weight of these mixtures (a), (b) and (c) for 6 hours at 160° C results in reaction products which are still completely free from gel. The reaction is accompanied by the liberation of about 37.6 liters of $CO_2$ (corresponding to the formation of from about 1.68 to 1.72 mol of:

(I)

and of isocyanato uretone imine adducts of (I) and monomeric tolylene diisocyanate or of adducts of (I) and allophanate, biuret or isocyanurate polyisocyanates). The products of the process have the following isocyanate contents and viscosities:

| | |
|---|---|
| (a) 34.9 % NCO | $\eta$ 20° C = 570 cP |
| (b) 32.3 % NCO | $\eta$ 20° C = 830 cP |
| (c) 31.4 % NCO | $\eta$ 20° C = 685 cP |

EXAMPLE 21

The following example shows that mixtures of tolylene-2,4-diisocyanate and tolylene-2,6-diisocyanate in which the ratio of isomers is approximately 65:35 will react readily with catalyst (F) described in Example 13 which carries out preferential carbodiimidization of the 2,4-isomer and converts the mixtures into polyisocyanate mixtures with exceptionally low viscosity in the course of 5 hours at 152° C. Thus, 3132 parts by weight of such a mixture of tolylene diisocyanate isomers (18 mol) are reacted with 36 parts by weight of catalyst (F) in the form of beads for 5 hours at 152° C. 112.4 liters of $CO_2$ are evolved and an exceptionally low viscosity mixture containing about 5 mol of and its triisocyanato uretone imine adduct is obtained. The isocyanate content of the solution is 34.4% while the viscosity at 20° C is 8.53 cP.

The product has excellent stability in storage over a tested period of 6 months. It produces no excess of $CO_2$ pressure in closed vessels and no increase in viscosity takes place. The equilibrium concentration of uretone imine triisocyanates in the polyisocyanate mixture is almost 70% by weight.

EXAMPLE 22

This example shows that carbodiimidization catalyst (F) (from Example 13) which is highly active for tolylene diisocyanates is practically completely inert at temperatures of from 150° to 155° C towards 4,4'-diisocyanatodiphenylmethane, its isomers and solutions thereof in multi-nuclear polyisocyanate mixtures of the type obtained by the phosgenation of commercial aniline-formaldehyde condensates. Within this temperature range, therefore, monoisocyanates and diisocyanates with smaller molecular dimensions may easily be selectively carbodiimidized without gel formation in mixtures with such higher molecular weight polyisocyanates.

a. 1000 parts by weight (4mol) of 4,4'-diisocyanatodiphenylmethane are treated with 12 parts by weight of catalyst (F) (from Example 13) for 2 hours at from 148 to 150° C. Virtually no carbodiimide formation takes place. 4,4'-diisocyanatodiphenylmethane crystallizes in practically unchanged form on cooling.

b. Multi-nuclear polyisocyanate mixtures which have been obtained by the phosgenation of aniline-formaldehyde condensates and have isocyanate contents of from 28 to 33% by weight and viscosities of from 100 to 600 cP behave as described under (a).

c. If from about 5 to 8% of tolylene diisocyanate, phenyl isocyanate or tolyl isocyanate are added to these polyisocyanates under the condition of experiment (a), these relatively low molecular weight isocyanates are rapidly and selectively carbodiimidized.

d. When a procedure analogous to that of (a) is carried out, but using the catalyst matrix described in Example 13 (c), which contains basic groups of the constitution:

as anchoring groups for the catalyst molecule, carbodiimidization of 4,4'-diisocyanatodiphenylmethane sets in at 150° C. About 0.1 mol of carbodiimide diisocyanate (calculated from the measured quantity of about 4.4 g of $CO_2$) is formed in the course of 1 hour. It is therefore possible by varying the catalysts according to the invention to carry out both selective and simultaneous carbodiimidization reactions in isocyanate mixtures.

EXAMPLE 23

This example again illustrates that monoisocyanates which have smaller molecular dimensions than tolylene diisocyanate or 4,4'-diisocyanatodiphenylmethane may be converted into carbodiimides such more rapidly and at relatively low temperatures. Carbodiimide formation from tolylene diisocyanates sets in rapidly at about 150° C when using catalyst (F) (from Example 13) but the smaller molecule of phenyl isocyanate can be rapidly and quantitatively carbodiimidized at from 130 to 132° C or in other words at a temperature which is lower by about 20° C.

238 parts by weight of phenyl isocyanate (2 mol) are converted into diphenyl carbodiimide with the aid of catalyst (F) at from 128° to 130° C in the course of 4 hours with evolution of 22.4 l of $CO_2$ (measured at 20° C). However, even if the diphenyl carbodiimide, which is liquid at 25° C is obtained in a very pure state, it continues to react after a storage time of about 8 hours to form various adducts or polymerization products, for example those which have the idealized constitution:

i.e. phenyl imino derivatives of triphenyl isocyanurate, but to some extent is also reacts to form linear polymers of the constitution:

i.e. substituted, basic polyguanidines.

EXAMPLE 24

This example shows that the less reactive aliphatic and araliphatic diisocyanates, such as hexamethylene diisocyanate and 1-isocyanato-3,3,5-trimethyl-5-isocyanatomethylcyclohexane ("isophorone diisocyanate"), may also be converted relatively rapidly into isocyanatocarbodiimides or polyisocyanato-polycarbodiimides and their uretone imines with the aid of the catalysts according to the invention at elevated temperatures.

a. 336 g (2 mol) of hexamethylene diisocyanate are partly converted into the compound of the formula:

with the evolution of 12.6 liters of $CO_2$ in the course of 3 hours at 160° C with the aid of 4 parts by weight of catalyst (C) (from Example 13).

A polyisocyanate mixture with an isocyanate content of 31.4% by weight and a viscosity of only 55 cP at 25° C is obtained. About 0.5 mol of diisocyanato carbodiimide are formed in the reaction. According to IR spectroscopic determinations, at least 70–75% of the diisocyanato carbodiimide continue to react with excess hexamethylene diisocyanate to form uretone imine triisocyanates of the constitution:

b. If instead of using the same catalyst as in the previous experiment the reaction is carried out with 4 parts by weight of catalyst (F) which has a more restricted active center 0.5 mol of:

are obtained only after about 5.5 hours and at temperatures of about 180° C. Here again polymerization of the carbodiimides to form polymeric iminocyanurates of polyguanidines is prevented by formation of the uretone imine:

EXAMPLE 25

The cycloaliphatic diisocyanate of the formula:

(isophorone diisocyanate)

may also be readily carbodiimidized at from about 160° to 165° C with the aid of catalyst (C) from Example 13.

444 parts by weight (2 mol) of the cycloaliphatic diisocyanate are reacted with a catalyst mixture of 4 parts by weight of (F) and 4 parts by weight of (C) for 4 hours at 165° C. 12.2 liters of $CO_2$ are liberated and about 0.5 mol of the compound:

are formed. Isocyanate content of the solution: 25.2%.

In this case again, triisocyanato uretone imine is subsequently formed almost quantitatively so that a solution of about 311 parts by weight of triisocyanato uretone imine in about 111 parts by weight of isophorone diisocyanate (approximately 73.5% by weight solution) is obtained.

EXAMPLE 26

The carbodiimidization of tolylene diisocyanates, 4,4'-diisocyanatodiphenylmethane and any other aromatic diisocyanates may also be continued to produce high molecular weight $\alpha,\omega$-diisocyanatopolycarbodiimides via the stage of diisocyanatocarbodiimides:

and the stage of triisocyanato uretone imines:

in a solvent-free reaction medium or in solution, in particular with catalyst (C) from Example 13. The products obtained have a pulverulent consistency. High molecular weight polycarbodiimides of 4,4'-diisocyanatodiphenylmethane melt at from 180° to 220° C and polycarbodiimides of p-phenylene diisocyanate melt at temperatures above 320° C while $\alpha,\omega$-diisocyanatopolycarbodiimides of the isomeric tolylene diisocyanates begin to soften at from 110° to 140° C and most of these powders are soluble in methylene chloride. These high molecular weight polycarbodiimides which contain $\alpha,\omega$-isocyanate groups may be prepared in a solvent-free reaction medium or in many cases it is advantageous to use solvents (preferably xylene, ethylene benzene, dimethyl formamide, dimethyl acetamide, tetramethyl urea or tetramethylene sulphone). The isocyanato uretone imines or polyuretone imines formed as intermediate products decompose at 130° C and are converted quantitatively into polycarbodiimides.

For example, high molecular weight $\alpha,\omega$-diisocyanatopolycarbodiimides are obtained in the form of solid foams which can easily be crushed to powders from:

a. 2 mol of 4,4'-diisocyanatodiphenylmethane or b. 2 mol of tolylene-2,4'-diisocyanate with the aid of 6 parts by weight of catalyst (C) (from Example 13) in each case if the reaction is carried out at from 160° to 180° C and continued until about 43 to 44 l of $CO_2$ have been evolved.

When preparing powders which are very difficult to dissolve, for example from p-phenylene diisocyanate or 4,4'-diisocyanatodiphenylmethane, the catalyst which is in the form of a powder or spherical particles may be left in the polycarbodiimide. When such polycarbodiimides are pressed with exclusion of water, hard, thermoplastic solids are obtained which soften at from 250° to 390° C and constitute very heat-resistant plastics.

What is claimed is:

1. High molecular weight carbodiimidization catalysts which are insoluble in water and in polyisocyanates and which consist of a high molecular weight, insoluble, organic or inorganic matrix and low molecular weight carbodiimidization catalysts bound to this matrix via ionic bonds.

2. Carbodiimidization catalysts according to claim 1 characterized in that the high molecular weight matrix contains basic ionizable groups and the low molecular weight carbodiimidization catalyst contains acid ionizable groups.

3. Carbodiimidization catalysts according to claim 2 characterized in that the low molecular weight carbodiimidization catalyst corresponds to the following general formula:

wherein

R[1] represents an alkyl, aryl or aralkyl group having up to 14 carbon atoms which may be substituted, preferably by halogen;

R[2], R[3] and R[4] each represent a $C_1$–$C_4$ alkyl group, hydrogen, chlorine or bromine;

R[5] represents hydrogen, a $C_1$–$C_{12}$ alkyl group and, if $b = 0$ a $C_6$–$C_{12}$ aryl group;

X and Y represent oxygen or sulphur; and $a$ and $b = 0$ or 1.

4. Carbodiimidization catalysts according to claim 3 characterized in that the high molecular weight matrix is a polystyrene which has been cross-linked with from 2 to 6% by weight of divinyl benzene.

5. A process for the preparation of high molecular weight carbodiimidization catalysts comprising contacting a high molecular weight, insoluble, inorganic or organic matrix which contains ionizable groups with a solution of low molecular weight carbodiimidization catalysts which contain ionizable groups, the charge of which is opposite in sign to that of the matrix.

* * * * *